United States Patent
Kuntimaddi

(10) Patent No.: US 12,146,032 B2
(45) Date of Patent: Nov. 19, 2024

(54) ZYLON BASED MATERIALS IN GOLF BALL

(71) Applicant: ACUSHNET COMPANY, Fairhaven, MA (US)

(72) Inventor: Manjari Kuntimaddi, Raynham, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/145,969

(22) Filed: Dec. 23, 2022

(65) Prior Publication Data

US 2024/0209152 A1 Jun. 27, 2024

(51) Int. Cl.
  A63B 37/06 (2006.01)
  A63B 37/00 (2006.01)
  C08G 73/22 (2006.01)

(52) U.S. Cl.
  CPC .......... *C08G 73/22* (2013.01); *A63B 37/0024* (2013.01); *A63B 37/0039* (2013.01); *A63B 37/0051* (2013.01); *A63B 37/0074* (2013.01); *A63B 37/0075* (2013.01); *A63B 37/0076* (2013.01); *A63B 2209/023* (2013.01)

(58) Field of Classification Search
  CPC ............ A63B 37/0038; A63B 37/0023; A63B 37/005
  See application file for complete search history.

(56) References Cited

U.S. PATENT DOCUMENTS

2004/0116210 A1* 6/2004 Sullivan ................. A63B 37/12
                                                      473/374
2014/0099472 A1* 4/2014 Greenhill ................. F41H 5/04
                                                      427/532

OTHER PUBLICATIONS

Fiber Brokers International, "All About Zylon®," https://www.fiberbrokers.com/technical-materials-recycling/all-about-zylon/ (last accessed Dec. 23, 2022) (3 pages).
Avient, "Zylon® PBO," www.avient.com/products/fiber-line-engineered-fiber-solutions/high-performance-synthetic-fibers/zylon-pbo-fiber (last accessed Dec. 23, 2022) (2 pages).
Science Direct, "Zylon," https://www.sciencedirect.com/topics/engineering/zylon (last accessed Dec. 23, 2022) (18 pages).

* cited by examiner

*Primary Examiner* — Raeann Gorden
(74) *Attorney, Agent, or Firm* — Finnegan, Henderson, Farabow, Garrett & Dunner LLP

(57) ABSTRACT

A golf ball and golf ball composition are disclosed. The golf ball may include a core layer. The golf ball may further include a cover layer. The golf ball may contain any layer that includes a Zylon based material.

9 Claims, 2 Drawing Sheets

ZYLON BASED MATERIALS IN GOLF BALL

TECHNICAL FIELD

The present disclosure relates generally to compositions for use in golf balls that provide increased rebound upon impact and increase the power of a golf ball when struck with a club. More particularly, the present disclosure provides compositions and golf balls made from such compositions that contain a Zylon® based material to provide an enhanced strength and modulus of elasticity.

BACKGROUND

The performance of a golf ball is affected by a variety of factors including the materials, weight, size, dimple pattern, and external shape of the golf ball. As a result, golf ball manufacturers are constantly improving or tweaking the performance of golf balls by adjusting the materials and construction of the ball as well as the dimple pattern and dimple shape.

For example, the resiliency and rebounding (Coefficient of Restitution) performance of the golf ball are generally driven by the composition and construction of the golf ball core. The spin rate and feel of the ball also are important properties that are affected by the composition and construction of the core. The spin rate refers to the rate of rotation of the golf ball after being hit with a club and may be affected by the compression of the core, i.e., how much the core deflects under a given load. Generally, changing the compression of a golf ball or golf ball core alters the spin rate of the golf ball similarly for both driver shots and short distance shots. For example, increasing the compression of a golf ball or golf ball core may cause a 10 percent increase in spin rates for both short distance and driver shots.

Most professionals and highly skilled amateurs (i.e., those who can control the spin of a golf ball) generally prefer balls with high spin rates to allow for better control in and around the green and draw and fade on approach shots. Indeed, these balls are beneficial for short distance shots made with irons and wedges. In contrast, recreational players who cannot necessarily control the spin of the ball will likely find that it is easier to play with a golf ball with low spin because the spin from a golf ball with a high spin rate can create more shot dispersion, i.e., more stray off to the left or right of the centerline, especially if the ball is hooked or sliced.

Meanwhile, the "feel" of the ball generally refers to the sensation that a player experiences when striking the ball with the club. Most players prefer balls having a soft feel, because the players experience a more natural and comfortable sensation when the club face contacts these balls. Balls having a softer feel are particularly desirable when making short shots around the green, because the player senses more with such balls. The feel of the ball primarily depends upon the hardness and compression of the ball.

Accordingly, there remains a need for golf balls that are designed to produce desired performance characteristics such as resiliency, rebounding, spin, and feel, while maintaining a desired resistance to environmental conditions such as moisture absorption. Moisture absorbed in golf ball cores increases the golf ball weight and significantly decreases rebound and distance traveled when struck with a club. In this aspect, it would be advantageous to tailor the composition of a golf ball such that the finished golf ball has the desired hardness, compression, and moisture absorption resistance to account for short distance and driver shots for players having different levels of expertise as well as other advantageous properties, features, and benefits. The present disclosure provides compositions for use in golf ball cores and golf balls containing Zylon based materials to enhance golf ball rigidity, improve rebound, and improve moisture absorption resistance.

SUMMARY

The embodiments provided herein disclose a golf ball composition, and more particularly, a golf ball composition including a Zylon based material.

In some embodiments, the present disclosure provides a golf ball comprising a core layer and a cover layer, wherein any layer in the golf ball includes a Zylon based material. The Zylon based material may be a filler, a reinforcing agent, or is included in an intermediate layer. The intermediate layer may be a casing layer. The Zylon based material may be at least one of a filament, a spun yarn, or a fiber. The Zylon based material may be a filler in the core layer and may be present in an amount from 0.1 wt % to 20 wt %. The Zylon based material may be the intermediate layer and may be a spun yarn or wound fiber up to 0.140 inches thick.

In some embodiments, the present disclosure discloses a golf ball comprising a core layer, an intermediate layer, and a cover layer, wherein the intermediate layer includes a Zylon based material. The intermediate layer may be a casing layer. At least one of the core layer or the cover layer may include a Zylon based material. The Zylon based material may be a filler or reinforcing agent. The Zylon based material may be at least one of a filament, a spun yarn, or a fiber. The Zylon based material may be a filler in the core layer and may be present in an amount from 0.1 wt. % to 20 wt. %. The Zylon based material may be the intermediate layer and may be a spun yarn or wound fiber up to 0.140 inches thick.

In some embodiments, the present disclosure discloses a golf ball comprising a dual core layer with an inner core layer and an outer core layer, an intermediate layer, and a cover layer, wherein the intermediate layer includes a Zylon based material. The intermediate layer may be a casing layer. At least one of the inner core layer, the outer core layer, or the cover layer may include a Zylon based material. The Zylon based material may be a filler or reinforcing agent. The Zylon based material may be at least one of a filament, a spun yarn, or a fiber. The Zylon based material may be a filler in at least one of the inner core layer or the outer core layer and may be present in an amount from 0.1 wt. % to 20 wt. % of the dual core layer. The Zylon based material may be the intermediate layer and may be a spun yarn or wound fiber up to 0.140 inches thick.

BRIEF DESCRIPTION OF DRAWING(S)

Further features and advantages of the disclosure can be ascertained from the following detailed description that is provided in connection with the drawings described below:

DETAILED DESCRIPTION

Figure 1:
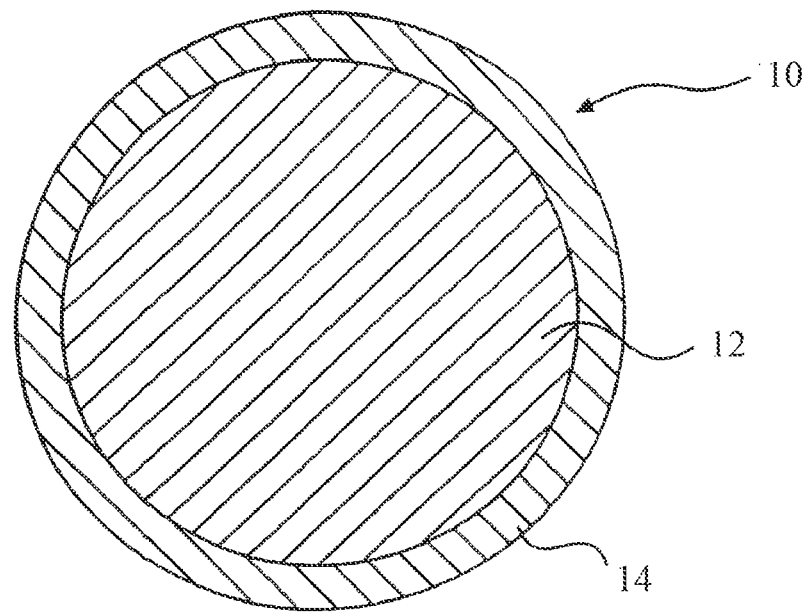
FIG. 1 is a cross-sectional view of an example two-piece golf ball, consistent with embodiments of the present disclosure.

The present disclosure relates to compositions that may be used to increase rigidity, rebound, and moisture absorption resistance in golf balls.

While the golf ball core is functionally different from the other layers of the golf ball and operates somewhat independently, the golf ball core of the present disclosure significantly influences the overall performance of the finished golf ball including such a core. Without being bound by any particular theory, since a core typically represents about 90 percent of the golf ball weight, performance characteristics of a finished golf ball that contains the core of the present disclosure may be tailored by changing the core composition. For example, altering the core composition may have a significant effect on long shots, e.g., shots off of a driver, and approach shots, e.g., shots made with irons and wedges. In fact, adjusting the composition of cores made in accordance with this present disclosure, even in relatively small amounts, can significantly affect how a golf ball performs on long and short distance shots. The core formulations, cores, golf balls, and resulting performance characteristics are discussed in greater detail below.

Core Formulations

The present disclosure provides golf balls having single- or multi-layered cores made from core rubber formulations. In some embodiments, the core rubber formulations of the present disclosure include a base rubber, a hardening agent, a cross-linking agent, a free radical initiator, and an additive. The core rubber formulations may further contain a water releasing agent. The additives may be one or more of a Zylon based material, metal oxide, metal fatty acid or fatty acid, antioxidant, soft and fast agent, or fillers. Concentrations of components are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100

Base Rubber

The core rubber formulations of the present disclosure include a base rubber. In some embodiments, the base rubber may include natural and synthetic rubbers and combinations of two or more thereof. Examples of natural and synthetic rubbers suitable for use as the base rubber include, but are not limited to, polybutadiene, polyisoprene, ethylene propylene rubber (EPR), ethylene-propylene-diene (EPDM) rubber, grafted EPDM rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof.

For example, the core may be formed from a rubber formulation that includes polybutadiene as the base rubber. Polybutadiene is a homopolymer of 1,3-butadiene. The double bonds in the 1,3-butadiene monomer are attacked by catalysts to grow the polymer chain and form a polybutadiene polymer having a desired molecular weight. Any suitable catalyst may be used to synthesize the polybutadiene rubber depending upon the desired properties. In one embodiment, a transition metal complex (for example, neodymium, nickel, or cobalt) or an alkyl metal such as alkyl lithium is used as a catalyst. Other catalysts include, but are not limited to, aluminum, boron, lithium, titanium, and combinations thereof. The catalysts produce polybutadiene rubbers having different chemical structures. In a cis-bond configuration, the main internal polymer chain of the polybutadiene appears on the same side of the carbon-carbon double bond contained in the polybutadiene. In a trans-bond configuration, the main internal polymer chain is on opposite sides of the internal carbon-carbon double bond in the polybutadiene. The polybutadiene rubber can have various combinations of cis- and trans-bond structures. For example, the polybutadiene rubber may have a 1,4 cis-bond content of at least 40 percent. In another embodiment, the polybutadiene rubber has a 1,4 cis-bond content of greater than 80 percent. In still another embodiment, the polybutadiene rubber has a 1,4 cis-bond content of greater than 90 percent. In general, polybutadiene rubbers having a high 1,4 cis-bond content have high tensile strength and rebound.

The polybutadiene rubber may have a relatively high or low Mooney viscosity. Generally, polybutadiene rubbers of higher molecular weight and higher Mooney viscosity have better resiliency than polybutadiene rubbers of lower molecular weight and lower Mooney viscosity. However, as the Mooney viscosity increases, the milling and processing of the polybutadiene rubber generally becomes more difficult. Blends of high and low Mooney viscosity polybutadiene rubbers may be prepared as is described in U.S. Pat. Nos. 6,982,301 and 6,774,187, the disclosures of which are hereby incorporated by reference, and used in accordance with the present disclosure. In general, the lower limit of Mooney viscosity may be about 30 or 35 or 40 or 45 or 50 or 55 or 60 or 70 or 75 and the upper limit may be about 80 or 85 or 90 or 95 or 100 or 105 or 110 or 115 or 120 or 125 or 130. For example, the polybutadiene used in the rubber formulation may have a Mooney viscosity of about 30 to about 80 or about 40 to about 60.

Examples of commercially available polybutadiene rubbers that can be used in rubber formulations in accordance with the present disclosure, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR—Nd Group Il and Group III, available from Nizhnekamskneftekhim, Inc. of Nizhnekamsk, Tartarstan Republic.

In another embodiment, the core is formed from a rubber formulation including butyl rubber. Butyl rubber is an elastomeric copolymer of isobutylene and isoprene. Butyl rubber is an amorphous, non-polar polymer with good oxidative and thermal stability, good permanent flexibility, and high moisture and gas resistance. Generally, butyl rubber includes copolymers of about 70 percent to about 99.5 percent by weight of an isoolefin, which has about 4 to 7 carbon atoms, for example, isobutylene, and about 0.5 percent to about 30 percent by weight of a conjugated multiolefin, which has about 4 to 14 carbon atoms, for example, isoprene. The resulting copolymer contains about 85 percent to about 99.8 percent by weight of combined isoolefin and about 0.2 percent to about 15 percent of combined multiolefin. A commercially available butyl rubber suitable for use in rubber formulations in accordance with the present disclosure includes Bayer Butyl 301 manufactured by Bayer AG.

The rubber formulations may include a combination of two or more of the above-described rubbers as the base rubber. In some embodiments, the rubber formulation of the present disclosure includes a blend of different polybutadiene rubbers. In this embodiment, the rubber formulation may include a blend of a first polybutadiene rubber and a second polybutadiene rubber in a ratio of about 5:95 to about 95:5. For example, the rubber formulation may include a first polybutadiene rubber and a second polybutadiene rubber in a ratio of about 10:90 to about 90:10 or about 15:85 to about 85:15 or about 20:80 to about 80:20 or about 30:70 to about 70:30 or about 40:60 to about 60:40. In other embodiments, the rubber formulation may include a blend of more than two polybutadiene rubbers or a blend of polybutadiene rubber(s) with any of the other elastomers discussed above.

In other embodiments, the rubber formulation used to form the core includes a blend of polybutadiene and butyl rubber. In this embodiment, the rubber formulation may include a blend of polybutadiene and butyl rubber in a ratio of about 10:90 to about 90:10. For example, the rubber formulation may include a blend of polybutadiene and butyl rubber in a ratio of about 10:90 to about 90:10 or about 20:80 to about 80:20 or about 30:70 to about 70:30 or about 40:60 to about 60:40. In other embodiments, the rubber formulation may include polybutadiene and/or butyl rubber in a blend with any of the other elastomers discussed above.

In further embodiments, the rubber formulation used to form the core includes a blend of polybutadiene and EPDM rubber or grafted EPDM rubber as the base rubber. In still further embodiments, the rubber formulations may include a combination of polybutadiene rubber and EPDM rubber as the base rubber. In this embodiment, the EPDM may be included in the rubber formulation in an amount of about 0.1 to about 20 or about 1 to about 15 or about 3 to about 10 parts by weight per 100 parts of the total rubber. For example, EPDM may be included in the rubber formulation in an amount of about 5 parts by weight per 100 parts of the total rubber. In still further embodiments, the core formulations may combine EPDM rubber and two or more different types of polybutadiene rubber, such as two or more different types of high cis-1,4 polybutadiene, as the base rubber.

The rubber formulations include the base rubber in an amount of 100 phr. That is, when more than one rubber component is used in the rubber formulation as the base rubber, the sum of the amounts of each rubber component should total 100 phr. In some embodiments, the rubber formulations include polybutadiene rubber as the base rubber in an amount of 100 phr. In other embodiments, the rubber formulations include polybutadiene rubber and a second rubber component. In this embodiment, the polybutadiene rubber may be used in an amount of about 80 to about 99.9 parts by weight per 100 parts of the total rubber and the second rubber component may be used in an amount of about 0.1 to about 20 parts by weight per 100 parts of the total rubber. In further embodiments, the polybutadiene rubber may be used in an amount of about 85 to about 99 parts by weight per 100 parts of the total rubber and the second rubber component may be used in an amount of about 1 to about 15 parts by weight per 100 parts of the total rubber. In yet other embodiments, the polybutadiene rubber may be used in an amount of about 90 to about 97 parts by weight per 100 parts of the total rubber and the second rubber component may be used in an amount of about 3 to about 10 parts by weight per 100 parts of the total rubber. In still further embodiments, the polybutadiene rubber may be used in an amount of about 94 to about 96 parts by weight per 100 parts of the total rubber and the second rubber component may be used in an amount of about 4 to about 6 parts by weight per 100 parts of the total rubber. In some embodiments, the second rubber component is EPDM rubber.

The base rubber may be used in the rubber formulation in an amount of at least about 5 percent by weight based on total weight of the rubber formulation. In some embodiments, the base rubber is included in the rubber formulation in an amount within a range having a lower limit of about 10 percent or 20 percent or 30 percent or 40 percent or 50 percent or 55 percent and an upper limit of about 60 percent or 70 percent or 80 percent or 90 percent or 95 percent or 100 percent. For example, the base rubber may be present in the rubber formulation in an amount of about 30 percent to about 80 percent by weight based on the total weight of the rubber formulation. In another example, the rubber formulation includes about 40 percent to about 70 percent base rubber based on the total weight of the rubber formulation.

Hardening Agent

The rubber formulations of the present disclosure include a hardening agent. Without being bound to any particular theory, the hardening agent may affect the hardness of the core. Suitable hardening agents include, but are not limited to, benzoic compounds comprising a nitro functional group and one of a hydroxyl, amino, or sulfhydryl functional group. Nonlimiting examples of hardening agents include nitrophenol, nitroaniline, and nitrothiophenol. Different isomers of the hardening agent may be used such as, for example, 2-nitrophenol, 3-nitrophenol, 4-nitrophenol, 2-nitroaniline, 3-nitroaniline, 4-nitroaniline, 2-nitrothiophenol, 3-nitrothiophenol, 4-nitrothiophenol, and combinations thereof. Some hardening agents, for example nitrophenol, may be advantageous because they are safe and/or easy to handle during manufacturing.

The hardening agent may be included in the rubber formulation in varying amounts depending on the desired characteristics of the golf ball core. For example, the hardening agent may be used in an amount of 0.01 to about 3 parts by weight per 100 parts of the total rubber. In one embodiment, the rubber formulation of the core includes about 0.05 to about 1.5 or about 0.1 to about 1 or about 0.1 to 0.5 parts by weight hardening agent per 100 parts of the total rubber. In another embodiment, the hardening agent is included in the rubber formulation in an amount of about 0.2 to about 0.7 parts by weight per 100 parts of the total rubber.

In still another embodiment, the rubber formulation includes about 0.05 to about 0.3 or 0.2 to about 0.4 or about 0.3 to about 0.5 or about 0.4 to about 0.6 parts by weight hardening agent per 100 parts of the total rubber.

Water Releasing Agent

The core rubber formulations of the present disclosure include a water releasing agent. A "water releasing agent," as used herein, refers to a compound having at least one water molecule available for release during the curing process.

The water releasing agent of the present disclosure has a moisture content capable of releasing a sufficient amount of water to promote decomposition of the free radical initiator and deactivation of radicals during the curing process. The moisture content in the water releasing agent can be calculated as the mass of water in the water releasing agent divided by the total weight of the water releasing agent. In some embodiments, the water releasing agent has a moisture content (in its molecular form) of at least about 5 percent by mass. In further embodiments, the water releasing agent has a moisture content ranging from about 5 percent by mass to about 95 percent by mass. In still further embodiments, the water releasing agent has a moisture content ranging from about 10 percent by mass to about 90 percent by mass. In yet further embodiments, the water releasing agent has a moisture content ranging from about 15 percent by mass to about 85 percent by mass. In further embodiments, the water releasing agent has a moisture content of at least about 50 percent by mass. For example, the water releasing agent has a moisture content of about 50 percent by mass to about 95 percent by mass.

In some embodiments, the water releasing agent of the present disclosure may be a metal sulfate hydrate having one or more waters of hydration capable of being released during the reactions of the present disclosure. In one embodiment, the metal may be an alkaline earth metal. For example, the metal may be calcium, magnesium, beryllium, strontium, barium, or radium. In one embodiment, the metal of the metal sulfate hydrate is calcium. In another embodiment, the metal of the metal sulfate hydrate is magnesium. In further embodiments, the metal may be a transition metal or a post-transition metal. For instance, the metal may be zinc, copper, iron, cobalt, manganese, chromium, nickel, aluminum, zirconium, cadmium, indium, or vanadium. In still further embodiments, the metal may be neodymium or lanthanum.

The metal sulfate hydrate may have any number of waters of hydration. In some embodiments, the metal sulfate hydrate may have from 0.5 to ten waters of hydration. For instance, the metal sulfate hydrate may be a hemihydrate, monohydrate, dihydrate, trihydrate, tetrahydrate, pentahydrate, hexahydrate, heptahydrate, octahydrate, nonahydrate, or decahydrate. In further embodiments, the metal sulfate hydrate may have from one to seven waters of hydration. In still further embodiments, the metal sulfate hydrate may have from one to four waters of hydration. In yet further embodiments, the metal sulfate hydrate may have from one to three waters of hydration. In other embodiments, the metal sulfate hydrate may have two waters of hydration. For example, in one embodiment, the metal sulfate hydrate may be a dihydrate. In still further embodiments, the metal sulfate hydrate may be a heptahydrate (i.e., having seven waters of hydration).

Examples of suitable metal sulfate hydrates contemplated for use as the water releasing agent in accordance with the present disclosure include, but are not limited to, calcium sulfate hemihydrate ($CaSO_4 \cdot 0.5H_2O$) calcium sulfate dihydrate ($CaSO_4 \cdot 2H_2O$), magnesium sulfate heptahydrate ($MgSO_4 \cdot 7H_2O$), zinc sulfate dihydrate ($ZnSO_4 \cdot 2H_2O$), zinc sulfate heptahydrate ($ZnSO_4 \cdot 7H_2O$), vanadium oxide sulfate hydrate ($VOSO_4 \cdot xH_2O$), neodymium sulfate hydrate ($Nd_2(SO_4)_3 \cdot xH_2O$), lanthanum oxalate hydrate ($La_2(C_2O_4)_3 \cdot xH_2O$), zinc sulfate monohydrate ($ZnSO_4 \cdot H_2O$), zirconium sulfate hydrate ($Zr(SO_4)_2 \cdot xH_2O$), beryllium sulfate tetrahydrate ($BeSO_4 \cdot 4H_2O$), manganese sulfate hydrate ($MnSO_4 \cdot xH_2O$), iron sulfate hydrate ($FeSO_4 \cdot xH_2O$), cobalt sulfate hydrate ($CoSO_4 \cdot xH_2O$), cadmium sulfate monohydrate ($CdSO_4 \cdot H_2O$), cadmium sulfate octahydrate ($CdSO_4 \cdot 8H_2O$), indium sulfate nonahydrate ($InSO_4 \cdot 9H_2O$), nickel sulfate heptahydrate ($NiSO_4 \cdot 7H_2O$), nickel sulfate hexahydrate ($NiSO_4 \cdot 6H_2O$), aluminum sulfate hydrate ($Al_2(SO_4)_3 \cdot xH_2O$), and copper sulfate pentahydrate ($CuSO_4 \cdot 5H_2O$). In some embodiments, the water releasing agent is a metal sulfate dihydrate such as calcium sulfate dihydrate and zinc sulfate dihydrate.

The water releasing agent may be included in the rubber formulation in varying amounts depending on the desired characteristics of the golf ball core. For example, the water releasing agent may be used in an amount of 0.1 to about 15 or about 0.5 to about 10 or about 1 to about 8 parts by weight water releasing agent per 100 parts of the total rubber. In one embodiment, the rubber formulation of the core includes about 0.2 to about 6 parts by weight water releasing agent per 100 parts of the total rubber. In some embodiments, the water releasing agent is included in the rubber formulation in an amount of about 2 to about 10 or about 3 to about 8 or about 3 to about 6 or about 5 to about 8 parts by weight water releasing agent per 100 parts of the total rubber. In other embodiments, the water releasing agent is included in the rubber formulation in an amount of about 0.5 to about 4 or about 0.7 to about 3.5 or about 1 to about 3 parts by weight water releasing agent per 100 parts of the total rubber. In yet further embodiments, the rubber formulation includes about 0.7 to about 1.4 or about 1.3 to about 1.7 or about 1.6 to about 2.3 or about 2.2 to about 3 parts by weight water releasing agent per 100 parts of the total rubber. For example, in some embodiments, the water releasing agent is present in the core rubber formulation in an amount of about 2 phr.

In some embodiments, the amount of water releasing agent in the rubber formulation may differ based on the compound used as the water releasing agent. In particular, the amount of water releasing agent included may depend on the moisture content and moisture availability in the water releasing agent. When the water releasing agent has a greater moisture content, less water releasing agent may be needed in the rubber formulation to give the golf ball core the desired performance characteristics. For example, more water releasing agent may be required when the water releasing agent is calcium sulfate dihydrate, which has a moisture content of approximately 21 percent, than if water releasing agent is magnesium sulfate heptahydrate, which has a moisture content of about 51 percent. The moisture availability refers to how readily the water molecules dissociate from the water releasing agent. If the water releasing agent used has a high moisture availability, less water releasing agent may be needed than if the water releasing agent has a low moisture availability. And, as discussed above, the amount of water releasing agent in the rubber formulation may differ based on the amount, type, or both of the hardening agent.

In some embodiments, it may be desirable to formulate the rubber formulation of the golf ball core based on the water content of the rubber formulation instead of or in addition to the concentration of the water releasing agent. In this aspect, the water content of the rubber formulation can be determined by multiplying the concentration of water releasing agent in parts by weight per 100 parts of the total rubber by the moisture content of the water releasing agent. For example, if the water releasing agent is included in the rubber formulation at about 2 parts by weight per 100 parts of the total rubber and the moisture content in the water releasing agent is 50 percent, the water content of the rubber formulation is 1 part by weight per 100 parts of the total rubber. As such, the desired or targeted water content of the rubber formulation may be used to determine the concentration (and/or type of) water releasing agent.

In some embodiments, the rubber formulation has a water content of about 0.01 to about 10 or about 0.05 to about 7 or about 0.1 to about 5 parts by weight water per 100 parts of the total rubber. In other embodiments, the water content of the rubber formulation is about 0.1 to about 2.5 or about 0.2 to about 2 or about 0.5 to about 1.5 parts by weight per 100 parts of the total rubber. In other embodiments, the water content of the rubber formulation is about 0.05 to about 1 or about 0.1 to about 0.5 or about 0.2 to about 0.6 parts by weight per 100 parts of the total rubber. In further embodiments, the rubber formulation has a water content of about 1 to about 3 or about 1.5 to about 2.5 or about 1 to about 2 parts by weight per 100 parts of the total rubber.

In addition, the amount of water releasing agent used in the rubber formulation may affect the amount of hardening agent used in the rubber formulation. For example, when the water releasing agent is included in an amount of about 1 to about 8 parts by weight, the hardening agent may be included in an amount of about 0.05 to about 0.6 parts by weight per 100 parts of the total rubber. In the alternative, when the water releasing agent is included in an amount of about 0.1 to about 5 parts by weight, the hardening agent may be included in an amount of about 0.3 to about 1.5 parts by weight per 100 parts of the total rubber.

Crosslinking Co-Agent

The rubber formulations further include a reactive crosslinking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA). An example of a commercially available zinc diacrylate includes Dymalink® 526 manufactured by Cray Valley.

The co-agent may be included in the rubber formulation in varying amounts depending on the desired characteristics of the golf ball core. For example, the co-agent may be used in an amount of about 5 to about 50 or about 10 to about 45 or about 15 to about 40 parts by weight per 100 parts of the total rubber. In one embodiment, the rubber formulation of the core includes about 35 to about 48 parts by weight co-agent per 100 parts of the total rubber. In another embodiment, the rubber formulation includes about 38 to about 45 or about 39 to about 42 parts by weight co-agent per 100 parts of total rubber. In another embodiment, the co-agent is included in the rubber formulation of the core in an amount of about 29 to about 37 or about 31 to about 35 parts by weight per 100 parts of the total rubber. In still another embodiment, the rubber formulation includes about 25 to about 33 or about 27 to about 31 parts by weight co-agent per 100 parts of the total rubber.

In some respects, the amount of co-agent in the rubber formulation may be altered based on the class of compounds, and the particular isomer within a class of compounds, used as the hardening agent. For example, when the rubber formulation includes 2-nitrophenol, the co-agent may be included in the rubber formulation in amount from about 37 to about 43 or about 39 to about 41 parts by weight per 100 parts of the total rubber. In another example, when the rubber formulation includes 3-nitrophenol, the co-agent may be included in the rubber formulation in amount from about 30 to about 36 or about 32 to about 34 parts by weight per 100 parts of the total rubber. In yet another example, when the rubber formulation includes 4-nitrophenol, the co-agent may be included in the rubber formulation in amount from about 26 to about 32 or about 28 to about 30 parts by weight per 100 parts of the total rubber. Without being bound to any particular theory, the concentration of co-agent may be altered to achieve the desired compression of the golf ball core when different hardening agents are used.

Free Radical Initiator

The core formulations may include a free radical initiator selected from an organic peroxide, a high energy radiation source capable of generating free radicals, or a combination thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BD-FF, commercially available from Akzo Nobel. In other embodiments, the free radical initiator is dimethyl terbutyl peroxide, including, but not limited to Trigonox® 101-50D-PD, commercially available from Nouryon.

Free radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubber, and an upper limit of 2.5 parts or 3 parts or 5 parts or 6 parts or 10 parts or 15 parts by weight per 100 parts of the total rubber. For example, the rubber formulation may include peroxide free radical initiators in an amount of about 0.1 to about 10 or about 0.5 to about 6 or about 1 to about 5 parts by weight per 100 parts of the total rubber. In another example, the rubber formulation may include peroxide free radical initiators in an amount of about 0.5 to about 2 or about 0.7 to about 1.8 or about 0.8 to about 1.2 or about 1.3 to about 1.7 parts by weight per 100 parts of the total rubber. In yet another example, the rubber formulation may include peroxide free radical initiators in an amount of about 1.5 to about 3 or about 1.7 to about 2.8 or about 1.8 to about 2.2 or about 2.3 to about 2.7 parts by weight per 100 parts of the total rubber.

Additives

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation. An example of a commercially available radical scavenger includes Rhenogran® Zn-PTCP-72 manufactured by Rheine Chemie. The radical scavenger may be included in the rubber formulation in an amount of about 0.3 to about 1 part by weight per 100 parts of the total rubber. In one embodiment, the rubber formulation may include about 0.4 to about 0.9 parts by weight radical scavenger per 100 parts of the total rubber. In another embodiment, the rubber formulation may include about 0.5 to about 0.8 parts by weight radical scavenger per 100 parts of the total rubber.

The rubber formulation may also include filler(s). Suitable non-limiting examples of fillers include Zylon based materials, carbon black, clay and nanoclay particles, talc, glass (e.g., glass flake, milled glass, and microglass), mica and mica-based pigments (e.g., Iriodin® pearl luster pigments from The Merck Group), and combinations thereof. Metal oxide and metal sulfate fillers are also contemplated for inclusion in the rubber formulation. Suitable metal fillers include, for example, particulate, powders, flakes, and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof. Suitable metal oxide fillers include, for example, zinc oxide, iron oxide, aluminum oxide, titanium oxide, magnesium oxide, and zirconium oxide. Suitable metal sulfate fillers include, for example, barium sulfate and strontium sulfate. When included, the fillers may be in an amount of about 1 to about 25 parts by weight per 100 parts of the total rubber. In one embodiment, the rubber formulation includes at least one filler in an amount of about 5 to about 20 or about 8 to about 15 parts by weight per 100 parts of the total rubber. In another embodiment, the rubber formulation includes at least one filler in an amount of about 8 to about 14 or about 10 to about 12 parts by weight per 100 parts of the total rubber. In yet another embodiment, the rubber formulation includes at least one filler in an amount of about 10 to about 17 or about 12 to about 15 parts by weight per 100 parts of the total rubber. In yet another embodiment, the rubber formulation includes at least one filler in an amount of about 10 to about 16 or about 12 to about 15 parts by weight per 100 parts of the total rubber. In a further embodiment, the rubber formulation includes at least one filler in an amount of about 12 to about 18 or about 14 to about 16 parts by weight per 100 parts of the total rubber. An example of a commercially available barium sulfate filler includes PolyWate® 325 manufactured by Cimbar Performance Minerals.

In some embodiments, the rubber formulation includes a Zylon® based material as a filler or reinforcing agent. Zylon® is a trademark name for a range of thermoset liquid crystalline polyoxazole. Specifically, Zylon® has a chemical name of poly(p-phenylene-2,6-benzobisoxazole) and has the following general repeating structure:

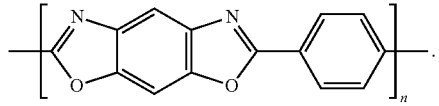

Zylon® is a synthetic polymeric material that features a high tensile strength and Young's Modulus. For example, the tensile strength of a Zylon based material may be approximately 5.8 GPa, and its Young's modulus may be approximately 270 GPa. Thus, Zylon® may be stiffer than steel. In comparison, the tensile strength and Young's Modulus of Kevlar may be approximately 3.62 GPa and 168 GPa, respectively. A Zylon based material may enhance the strength and compression of a golf ball core. A golf ball containing Zylon® may have increased rigidity, which may increase rebound upon impact, and power of the golf ball, when struck with a club. Furthermore, Zylon® contains an equilibrium moisture regain value of 2 at 55% humidity, which may enhance the resistance for moisture absorbed into the golf ball core. The Zylon based material used as a filler or reinforcing agent may be in the form of a filament or a fiber. It is appreciated that the Zylon based material, when used in the form of a fiber, may include chopped fiber, wound fiber, or staple fiber. In some embodiments, the amount of a Zylon based material used in the core as a filler may be in the amount of 20 parts by weight or less per 100 parts (i.e., 20 weight (wt) %) of total rubber, 15 wt % or less, 12 wt % or less, 10 wt % or less, 9 wt % or less, 6 wt % or less, 5 wt % or less, 4 wt % or less, 3 wt % or less, or 2 wt % or less, based on the total weight of the rubber composition. In some embodiments, the Zylon based material used in the core may be in the amount ranging from 0.1 wt % to 20 wt %, 5 wt % to 15 wt %, or 9 to 12 wt %, based on the total weight of the rubber composition. In some embodiments, the Zylon based material may be used a component of the golf ball core and may be present in an amount ranging from 0.1 wt % to 100 wt % of total weight of the core.

In some aspects, the amount of filler in the rubber formulation may be altered based on the compound, and the particular isomer of the compound, used as the hardening agent. For example, when the rubber formulation includes 2-nitrophenol, at least one filler may be included in the rubber formulation in amount from about 9 to about 13 parts by weight per 100 parts of the total rubber. In another example, when the rubber formulation includes 3-nitrophenol, the filler may be included in the rubber formulation in amount from about 11 to about 16 parts by weight per 100 parts of the total rubber. In yet another example, when the rubber formulation includes 4-nitrophenol, the filler may be included in the rubber formulation in amount from about 13 to about 17 parts by weight per 100 parts of the total rubber.

In some embodiments, more than one type of filler may be included in the rubber formulation. For example, the rubber formulation may include a first filler in an amount from about 5 to about 20 or about 8 to about 17 parts by weight per 100 parts total rubber and a second filler in an amount from about 1 to about 10 or about 3 to about 7 parts by weight per 100 parts total rubber. In another example, the rubber formulation may include a first filler in an amount from about 7 to about 13 or about 9 to about 12 parts by weight per 100 parts total rubber and a second filler in an amount from about 2 to about 8 or about 4 to about 6 parts by weight per 100 parts total rubber. In yet another example, the rubber formulation may include a first filler in an amount from about 10 to about 15 or about 13 to about 14 parts by weight per 100 parts total rubber and a second filler in an amount from about 2 to about 9 or about 3 to about 7 parts by weight per 100 parts total rubber. In a further example, the rubber formulation may include a first filler in an amount from about 10 to about 15 or about 13 to about 14 parts by weight per 100 parts total rubber and a second filler in an amount from about 13 to about 18 or about 14 to about 16 parts by weight per 100 parts total rubber.

Antioxidants, processing aids, accelerators (for example, tetra methylthiuram), dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art, may also be added to the rubber formulation. Examples of suitable processing aids include, but are not limited to, high molecular weight organic acids and salts thereof. Suitable organic acids are aliphatic organic acids, aromatic organic acids, saturated mono-functional organic acids, unsaturated mono-functional organic acids, multi-unsaturated mono-functional organic acids, and dimerized derivatives thereof. In one embodiment, the organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof.

Curing the Core Formulation

The base rubber, hardening agent, water releasing agent, cross-linking agent, free radical initiator, fillers, and any other materials used in forming the core, in accordance with the present disclosure, may be combined to form a mixture by any type of mixing known to one of ordinary skill in the art. Suitable types of mixing include single pass and multi-pass mixing, and the like. A single pass mixing process where ingredients are added sequentially is preferred, as this type of mixing tends to increase efficiency and reduce costs for the process. In embodiments where a free-radical initiator is used, it may be desirable to combine the hardening agent into the rubber formulation prior to adding the free-radical initiator.

The rubber formulation may be cured using conventional curing processes. Non-limiting examples of curing processes suitable for use in accordance with the present disclosure include peroxide-curing, sulfur-curing, high-energy radiation, and combinations thereof.

Diameter

The diameter of the core may vary. In some embodiments, the core diameter may range from about 1.49 to about 1.630 inches. For example, the core may have a diameter of 1.53 to 1.56 inches. In embodiments where the core comprises two or more layers, the diameter of the inner layer of the core may range from about 0.5 to about 1.45 inches or from about 1.0 to about 1.2 inches.

Golf Ball Construction

Golf balls having various constructions may be made in accordance with the present disclosure. For example, golf balls having one-piece, two-piece, three-piece, four-piece, and five or more-piece constructions with the term "piece" refer to any core, cover, or intermediate layer of a golf ball construction. Representative illustrations of such golf ball constructions are provided and discussed further below. The term, "layer" as used herein means generally any spherical portion of the golf ball.

Figure 2:
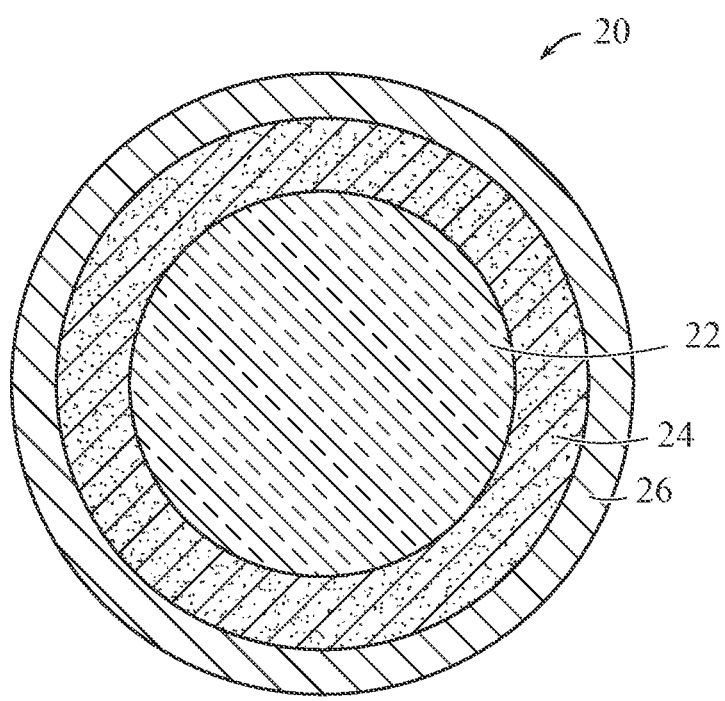
FIG. 2 is a cross-sectional view of an example three-piece golf ball, consistent with embodiments of the present disclosure.
Figure 3:
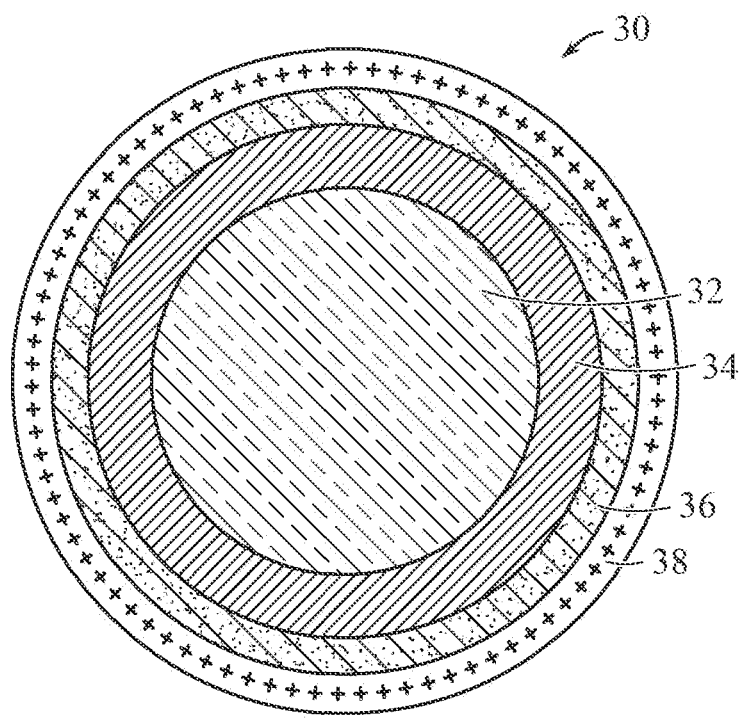
FIG. 3 is a cross-sectional view of an example four-piece golf ball, consistent with embodiments of the present disclosure.
Figure 4:
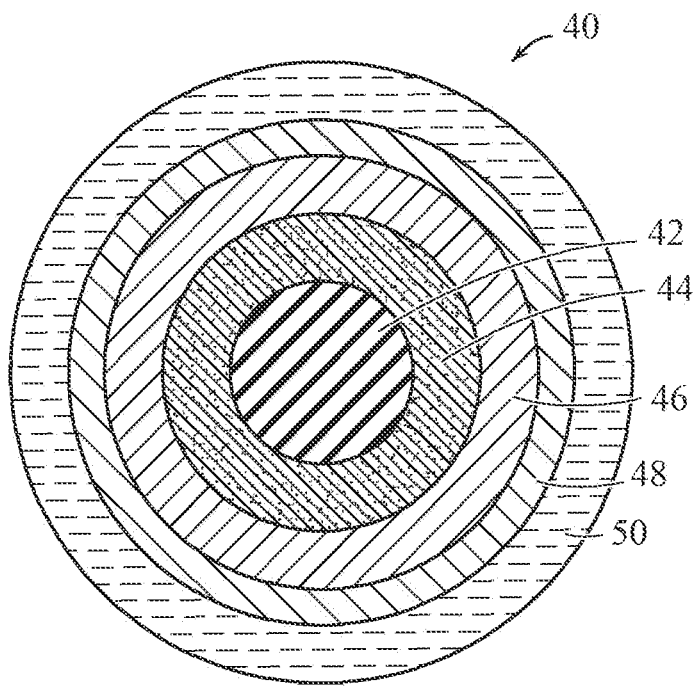
FIG. 4 is a cross-sectional view of an example five-piece golf ball, consistent with embodiments of the present disclosure.

In some embodiments, a golf ball of the present disclosure may be a one-piece ball where the core and cover form a single integral layer. As shown in FIG. 1, an example golf ball of the present disclosure may be a two-piece ball 10 comprising a single core layer 12 and a single cover layer 14. As shown in FIG. 2, an example golf ball 20 may comprise a core layer 22, an intermediate layer 24, and a cover layer 26. In FIG. 2, the intermediate layer 24 can be considered an outer core layer, an inner cover layer, a mantle or casing layer, or any other layer disposed between the core 22 and the cover layer 26. Referring to FIG. 3, an example four-piece golf ball 30 may comprise an inner core layer 32, an outer core layer 34, an intermediate layer 36, and an outer cover layer 38. In FIG. 3, the intermediate layer 36 may be considered a casing or mantle layer, or inner cover layer, or any other layer disposed between the outer core layer 34 and the outer cover of the ball 38. Referring to FIG. 4, an example five-piece golf ball 40 may comprise a three-layered core having an inner core layer 42, an intermediate core layer 44, an outer core layer 46, an inner cover layer 48, and an outer cover layer 50. As exemplified herein, a golf ball in accordance with the present disclosure can comprise any combination of any number of core layers, intermediate layers, and cover layers.

The formulations discussed above are suitable for use in the core or one or more of the core layers if multiple core layers are present. It is also contemplated that the formulations disclosed herein may be used to form one or more of the layers of any of the one, two, three, four, or five, or more-piece (layered) balls described above. That is, any of the core layers, intermediate layers, and/or cover layers may comprise the rubber formulation of this disclosure and may comprise the formulations including a Zylon based material of this disclosure. The formulations of different layers may be the same or different. The diameter and thickness of the different layers along with properties such as hardness and compression may vary depending upon the construction and desired playing performance properties of the golf ball.

Golf balls made in accordance with the present disclosure can be of any size, although the USGA requires that golf balls used in competition have a diameter of at least 1.68 inches. For play outside of United States Golf Association (USGA) rules, the golf balls can be of a smaller size. In one embodiment, golf balls made in accordance with the present disclosure have a diameter in the range of about 1.68 to about 1.80 inches.

In contrast to the core, the cover of a golf ball may play less of a role on shots off of a driver. However, because the cover plays a large role in generating spin on iron and wedge shots, the cover material and properties are still important. In this aspect, different materials may be used in the construction of the intermediate and cover layers of golf balls according to the present disclosure. For example, a variety of materials may be used for forming the outer cover including, for example, Zylon based materials; polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth) acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer; cross-linked trans-polyisoprene and blends thereof; polyester-based thermoplastic elastomers;

polyurethane-based thermoplastic elastomers; synthetic or natural vulcanized rubber; and combinations thereof.

In some embodiments, the cover may be formed from a Zylon based material. When used as a cover layer material, Zylon based materials may be thermoset or thermoplastic. The Zylon based materials may be used in a form of a filament, fiber, or spun yarn. In some embodiments, the amount of Zylon based material used may be from about 0.1 wt % of the cover layer up to about 100 wt % of the cover layer. In some embodiments, the amount of Zylon based material used may be from about 10 wt % to 90 wt %, 20 wt % to 80 wt %, 30 wt % to 70 wt %, or 40 wt % to 60 wt % of the cover layer.

In some embodiments, the cover may be formed from a polyurethane, polyurea, or hybrid of polyurethane-polyurea. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Conventional and non-conventional materials may be used for forming intermediate layers of the ball including, for instance, Zylon based materials, ionomer resins, highly neutralized polymers, polybutadiene, butyl rubber, and other rubber-based core formulations, and the like. Intermediate layers may include an inner cover layer, a casing layer, or a mantle layer. In preferred embodiments, a casing layer surrounding the core and located between the core and cover layer(s) includes a Zylon based material. The core diameter may be the same as described above. In some embodiments, the casing layer may surround a dual core, wherein a first core layer ranges from 0.5 inches to 1.45 inches thick, and a second core layer ranges from 0.18 inches to 1.080 inches thick, resulting in a dual core 1.580 to 1.630 inches in diameter. In preferred embodiments, the casing layer may have a diameter ranging from 0.01 inches to 0.14 inches. The Zylon based material may be a spun yarn or wound fiber, in which the amount of the Zylon based material included in the casing layer may be 100 wt. % of the casing layer. The Zylon based material in a spun yarn or wound fiber may be blended with another material, where the Zylon based material may be present in an amount from 10 wt % to 90 wt %, 20 wt % to 80 wt %, 30 wt % to 70 wt %, or 40 wt % to 60 wt % of the total weight of the casing layer. The Zylon based material suitable for use in the casing layer may be in the form of a filament, fiber, or spun yarn. In some embodiments, a Zylon based material used as a spun yarn may be wound around the core and subjected to heat treatment to melt into the core composition. A Zylon based casing layer may provide an enhanced moisture vapor barrier to reduce the amount of moisture absorbed into a rubber composition in the core. In some embodiments, a Zylon based material in the casing layer may be used to reinforce carbon in the casing layer and further improve tensile strength and rigidity of the golf ball.

In some embodiments, the inner cover layer, i.e., the layer disposed between the core and the outer cover, includes a Zylon based material. In this aspect, Zylon based materials suitable for use in accordance with the present disclosure may be in the form of a filament, fiber, or spun yarn. The amount of Zylon based materials may be from 0.1 wt % to 100 wt %. The Zylon based material may be a spun yarn or wound fiber, in which the amount of the Zylon based material included in the layer may be 100 wt. % of the layer. The Zylon based material in a spun yarn or wound fiber may be blended with another material, where the Zylon based material may be present in an amount from 10 wt % to 90 wt %, 20 wt % to 80 wt %, 30 wt % to 70 wt %, or 40 wt % to 60 wt % of the total weight of the inner cover layer. In some embodiments, a Zylon based fiber used as a spun yarn may be wound around the core and subjected to heat treatment to melt into the core composition. A Zylon based inner cover layer may provide an enhanced moisture vapor barrier to reduce the amount of moisture absorbed into a rubber composition in the core.

In some embodiments, the inner cover layer may include an ionomer. In this aspect, ionomers suitable for use in accordance with the present disclosure may include partially neutralized ionomers and highly neutralized ionomers (HNPs), including ionomers formed from blends of two or more partially neutralized ionomers, blends of two or more highly neutralized ionomers, and blends of one or more partially neutralized ionomers with one or more highly neutralized ionomers. For purposes of the present disclosure, "HNP" refers to an acid copolymer after at least 70 percent of all acid groups present in the composition are neutralized.

Preferred ionomers are salts of O/X- and O/X/Y-type acid copolymers, wherein O is an α-olefin, X is a $C_3$-$C_8$ α, β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α, β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate.

More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer may be at least about 15 wt %, at least about 25 wt %, at least about 40 wt %, or at least about 60 wt %, based on total weight of the copolymer. The amount of $C_3$ to $C_8$ α, β-ethylenically unsaturated mono- or dicarboxylic acid in the acid copolymer is typically from 1 wt % to 35 wt %, from 5 wt % to 30 wt %, from 5 wt % to 25 wt %, or from 10 wt % to 20 wt %, based on total weight of the copolymer. The amount of optional softening comonomer in the acid copolymer may be from 0 wt % to 50 wt %, from 5 wt % to 40 wt %, from 10 wt % to 35 wt %, or from 20 wt % to 30 wt %, based on total weight of the copolymer.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As discussed above, for HNP compositions, the acid groups are neutralized to 70 percent or greater, 70 to 100 percent, or 90 to 100 percent. In one embodiment, an excess amount of neutralizing agent, that is, an amount greater than the stoichiometric amount needed to neutralize the acid groups, may be used. That is, the acid groups may be neutralized to 100 percent or greater, for example 110 percent or 120 percent or greater. In other embodiments, partially neutralized compositions are prepared, wherein 10 percent or greater, normally 30 percent or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10 percent of the acid groups and sodium is added to neutralize an additional 90 percent of the acid groups.

"Low acid" and "high acid" ionomeric polymers, as well as blends of such ionomers, may be used. In general, low acid ionomers are considered to be those containing 16 wt % or less of acid moieties, whereas high acid ionomers are considered to be those containing greater than 16 wt % of acid moieties. In one embodiment, the inner cover layer is formed from a composition comprising a high acid ionomer. A suitable high acid ionomer is Surlyn® 8150. (Dow), which is a copolymer of ethylene and methacrylic acid, having an acid content of 19 wt %, 45 percent neutralized with sodium. In another embodiment, the inner cover layer is formed from a composition comprising a high acid ionomer and a maleic anhydride-grafted non-ionomeric polymer. An example of a suitable maleic anhydride-grafted polymer is Fusabond® 525D (Dow), which is a maleic anhydride-grafted, metallocene-catalyzed ethylene-butene copolymer having about 0.9 weight percent maleic anhydride grafted onto the copolymer. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960. In another embodiment, the inner cover layer is formed from a composition comprising a 50/25/25 blend of Surlyn® 8940/Surlyn® 9650/Surlyn® 9910. In yet another embodiment, the inner cover layer is formed from a composition comprising a 50/50 blend of Surlyn® 8940/Surlyn® 9650. A composition comprising a 50/50 blend of Surlyn® 8940 and Surlyn® 7940 also may be used.

The compositions used to make the layers outside of the core, e.g., the outer cover layer and, when present, an intermediate layer such as an inner cover layer, a casing layer, or a mantle layer, may contain a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, Zylon based materials, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The thickness of the outer cover layer is preferably within a range having a lower limit of 0.010 or 0.015 or 0.025 inches and an upper limit of 0.035 or 0.040 or 0.055 or 0.080 inches. The thickness of the intermediate layer is preferably within a range having a lower limit of 0.010 or 0.015 or 0.020 or 0.030 inches and an upper limit of 0.035 or 0.045 or 0.080 or 0.140 inches.

In preferred embodiments, the golf balls made in accordance with the present disclosure may include a core comprising a rubber formulation as described herein, a casing layer including a Zylon based material, and a cover layer. In other preferred embodiments, the golf balls made in accordance with the present disclosure may include a dual core comprising a rubber formulation as described herein, a casing layer including a Zylon based material, and a cover layer. In some embodiments, the casing layer may include a partially or fully neutralized ionomer, a thermoplastic polyester elastomer, a thermoplastic polyether block amide, or a thermoplastic or thermosetting polyurethane or polyurea, and the cover layer may be comprised of a Zylon based material and an ionomeric material. In some embodiments, the core may be comprised of a Zylon based material. In some embodiments, the dual core may be comprised of a Zylon based material. In some embodiments, an intermediate layer may be comprised of a Zylon based material.

When a dual cover is disposed about the core or an intermediate layer, the inner cover layer may have a thickness of about 0.01 inches to about 0.06 inches, about 0.015 inches to about 0.040 inches, or about 0.02 inches to about 0.035 inches. The outer cover layer may have a thickness of about 0.015 inches to about 0.055 inches, about 0.02 inches to about 0.04 inches, or about 0.025 inches to about 0.035 inches.

The golf balls of the present disclosure may be formed using a variety of application techniques. For example, the golf ball, golf ball core, or any layer of the golf ball may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. In this aspect, cover layers may be formed over the core using any suitable technique that is associated with the material used to form the layer. Preferably, each cover layer is separately formed over the core. For example, an ethylene acid copolymer ionomer composition may be injection-molded to produce half-shells over the core. Alternatively, the ionomer composition can be placed into a compression mold and molded under sufficient pressure, temperature, and time to produce the hemispherical shells, which may then be placed around the core in a compression mold. An outer cover layer including a polyurethane or polyurea composition over the ball sub-assembly may be formed by using a casting process.

Golf balls made in accordance with the present disclosure may be subjected to finishing steps such as flash-trimming, surface-treatment, marking, coating, and the like using techniques known in the art. In one embodiment, a white-pigmented cover may be surface-treated using a suitable method such as, for example, corona, plasma, or ultraviolet (UV) light-treatment. Indicia such as trademarks, symbols, logos, letters, and the like may be printed on the cover using pad-printing, ink-jet printing, dye-sublimation, or other suitable printing methods. Clear surface coatings (for example, primer and topcoats), which may contain a fluorescent whitening agent, may be applied to the cover. Golf balls may also be painted with one or more paint coatings in a variety of colors. In one embodiment, white primer paint is applied first to the surface of the ball and then a white top-coat of paint may be applied over the primer.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the disclosure(s) set forth herein

What is claimed is:

1. A golf ball, comprising:
a core layer;
an intermediate layer; and
a cover layer, wherein the intermediate layer is 100 wt. % poly(p-phenylene-2,6-benzobisoxazole), and wherein the intermediate layer is spun yarn or wound fiber up to 0.140 inches thick.

2. The golf ball of claim 1, wherein the intermediate layer is a casing layer.

3. The golf ball of claim 1, wherein at least one of the core layer or the cover layer includes a poly(p-phenylene-2,6-benzobisoxazole)-based material.

4. The golf ball of claim 1, wherein the poly(p-phenylene-2,6-benzobisoxazole) is wound around the core layer and heat treated.

5. A golf ball comprising:
a dual core layer with an inner core layer and an outer core layer;
an intermediate layer; and
a cover layer,
wherein the intermediate layer is 100 wt. % poly(p-phenylene-2,6-benzobisoxazole), and wherein the intermediate layer is a spun yarn or wound fiber up to 0.140 inches thick.

6. The golf ball of claim 5, wherein the intermediate layer is a casing layer.

7. The golf ball of claim 5, wherein at least one of the inner core layer, the outer core layer, or the cover layer includes a poly(p-phenylene-2,6-benzobisoxazole)-based material.

8. The golf ball of claim 7, wherein the poly(p-phenylene-2,6-benzobisoxazole)-based material is a filler or reinforcing agent.

9. The gold ball of claim 5, wherein the poly(p-phenylene-2,6-benzobisoxazole) is wound around the dual core and heat treated.

* * * * *